United States Patent
Farges

(10) Patent No.: US 10,399,482 B2
(45) Date of Patent: Sep. 3, 2019

(54) LIGHT MODULE, BY EXAMPLE FOR ILLUMINATING AN OUTER COMPONENT OF A VEHICLE

(71) Applicant: Dura Operating, LLC, Auburn Hills, MI (US)

(72) Inventor: Thomas Farges, Gometz le Chatel (FR)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/890,518

(22) Filed: Feb. 7, 2018

(65) Prior Publication Data

US 2018/0236930 A1 Aug. 23, 2018

(30) Foreign Application Priority Data

Feb. 21, 2017 (EP) ..................................... 17157174

(51) Int. Cl.
*B60Q 1/26* (2006.01)
*F21V 8/00* (2006.01)
*G02B 6/42* (2006.01)

(52) U.S. Cl.
CPC ........... *B60Q 1/2615* (2013.01); *G02B 6/001* (2013.01); *G02B 6/4201* (2013.01)

(58) Field of Classification Search
CPC ..... G02B 6/006; G02B 6/001; F21V 2200/00; B60Q 1/2615
See application file for complete search history.

(56) References Cited

U.S. PATENT DOCUMENTS

| 4,885,663 A * | 12/1989 | Parker | .................... G02B 6/001 362/561 |
|---|---|---|---|
| 4,936,663 A | 6/1990 | Mori | |
| 2015/0016147 A1 | 1/2015 | Chen | |
| 2015/0277034 A1 | 10/2015 | Nagura | |

FOREIGN PATENT DOCUMENTS

| DE | 202007014598 U1 | 2/2009 |
|---|---|---|
| WO | WO2005106899 A1 | 11/2005 |
| WO | WO2006086563 A2 | 8/2006 |
| WO | WO2015154972 A1 | 10/2015 |
| WO | WO2016112897 A1 | 7/2016 |

OTHER PUBLICATIONS

EP Extended Search Report for EP Application No. 17157174.8 dated Jun. 27, 2017, (7 pages).

\* cited by examiner

*Primary Examiner* — Anne M Hines
(74) *Attorney, Agent, or Firm* — Reising Ethington P.C.

(57) ABSTRACT

A light module includes a light source configured for emitting an illumination beam, and an optical fiber guiding the illumination beam between a first end facing the light source and a second end opposite the light source. The light module further includes a reflector positioned at the second end of the optical fiber and reflecting the illumination beam back from the second end toward the first end of the optical fiber.

18 Claims, 4 Drawing Sheets

LIGHT MODULE, BY EXAMPLE FOR ILLUMINATING AN OUTER COMPONENT OF A VEHICLE

CROSS REFERENCE TO RELATED APPLICATIONS

This application claims priority to European Patent Application No.: EP17157174.8 filed Feb. 21, 2017.

TECHNICAL FIELD

The disclosure concerns a light module comprising a light source, an optical fiber and a reflector. By example, the light module can be configured for illuminating an outer component of a vehicle.

BACKGROUND

In the automotive field, it is known to illuminate outer components of a vehicle for aesthetic reasons. For example, the outer components can be strips extending along the profile of the vehicle body, such as strips mounted around lateral doors, rear trunk and/or rear windshield.

The illumination can be activated in specific conditions, such as braking, doors locking, night detection, or manual control from the dashboard. The illumination can be activated with a specific program, such as intermittent lighting with a predetermined pattern and at a predetermined tempo, or permanent lighting in darkness.

As non-limitative examples, automotive lighting devices are disclosed in documents WO2006086563, WO2015154972 and WO2016112897.

SUMMARY

The aim of the disclosure is to provide an improved light module.

To this end, the disclosure concerns a light module, comprising: a light source configured for emitting an illumination beam; and an optical fiber guiding the illumination beam between a first end facing the light source and a second end opposite the light source. According to at least one embodiment, the light module further includes a reflector positioned at the second end of the optical fiber and reflecting the illumination beam back from the second end toward the first end of the optical fiber.

Thanks to the reflector, the loss of beam energy can be compensated near the second end of the optical fiber. The overall illumination and visual aspect provided along the optical fiber are improved. The reflector is cheap and simple to implement.

According to further aspects of the invention which are advantageous but not compulsory, such a light module may incorporate one or several of the following features:

The reflector has an entry opening having an inner diameter inferior to an outer diameter of the optical fiber at the second end, which is inserted into the entry opening by force-fitting.
The reflector has an entry opening having an inner diameter equal or superior to an outer diameter of the optical fiber at the second end.
The reflector is glued or welded to the optical fiber.
The reflector has a reflecting surface receiving the second end of the optical fiber in abutment contact.
The reflector has a concave reflecting surface.
The reflector has a plane reflecting surface.
The light module comprises a lens positioned between the light source and the first end of the optical fiber, such that the illumination beam emitted by the light source is focalized toward the first end of the optical fiber.
The light module is configured for illuminating an outer component of a vehicle.
The light module comprises a housing for fastening the light module to the vehicle; a cover mounted on the housing; an inner space delimited between the housing and the cover; a printed circuit board mounted in the inner space; the light source mounted on the printed circuit board and configured for emitting the illumination beam; and a light guide mounted in the housing facing the light source and extending outside the inner space for guiding the illumination beam along the outer component, wherein the light guide includes the optical fiber extending outside the inner space.

DESCRIPTION OF THE DRAWINGS

The invention will now be explained in correspondence with the annexed figures, and as an illustrative example, without restricting the object of the invention. In the annexed figures.

DETAILED DESCRIPTION

Figure 1:
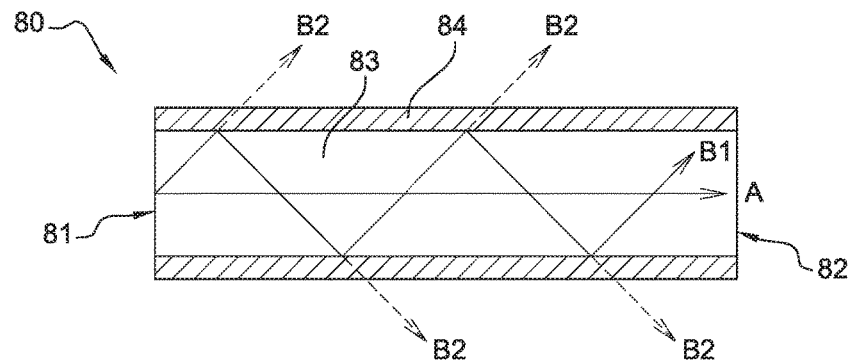
FIG. 1 is a longitudinal sectional view of an optical fiber.

FIG. 1 shows an optical fiber 80 extending along a longitudinal axis A between a first end 81 and a second end 82. Fiber 80 has a core 83 surrounded by a sheath 84. A light beam B1 is transmitted along core 83 and regularly reflected on the inner surface of sheath 84. Light beam B1 is partly refracted each time it is reflected, resulting in light beams B2 transmitted through sheath 84 outside fiber 80. Under those conditions, energy of each inner beam B1 and outer beams B2 decreases from end 81 toward end 82.

Figure 2:
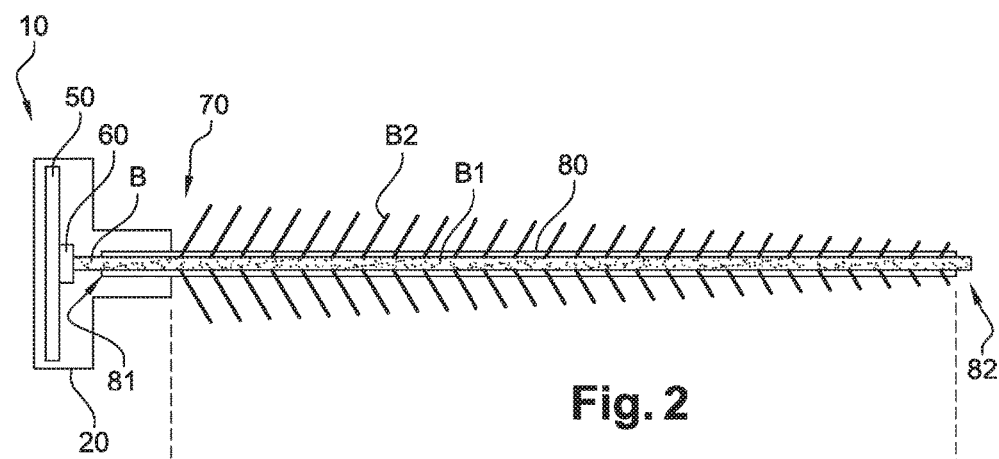
FIG. 2 is a sectional view of a light module comprising such an optical fiber.

FIG. 2 shows a light module 10 comprising a housing 20, a printed circuit board 50, a light source 60 and a light guide 70. Light source 60 is mounted on PCB 50 and configured for emitting an illumination beam B. Light guide 70 includes optical fiber 80.

Beam B enters fiber 80 via its first end 81 and is transmitted as beams B1 and B2, as explained here-above regarding FIG. 1.

Beam B1 escapes from fiber 80 at its end 82. Beams B2 are represented with decreasing energy from end 81 toward end 82 on FIG. 2.

Figure 3:
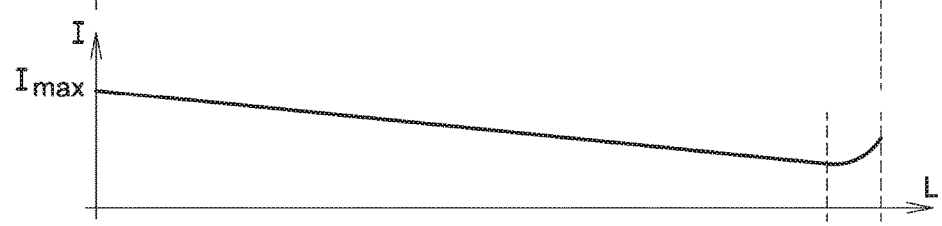
FIG. 3 is a graph showing the longitudinal length of the optical fiber on the abscissa and the intensity of illumination transmitted by the optical fiber on the ordinate, for the light module of FIG. 2.

FIG. 3 shows the intensity I of illumination emitted by optical fiber 80 along its length L, in the light module 10 of FIG. 2. A maximal intensity Imax can be observed when fiber 80 goes out of cover 20. A minimal intensity can be observed near end 82 due to decreasing energy of beams B2, with a slight increase due to beam B1 escaping fiber 80 at end 82.

Figure 4:
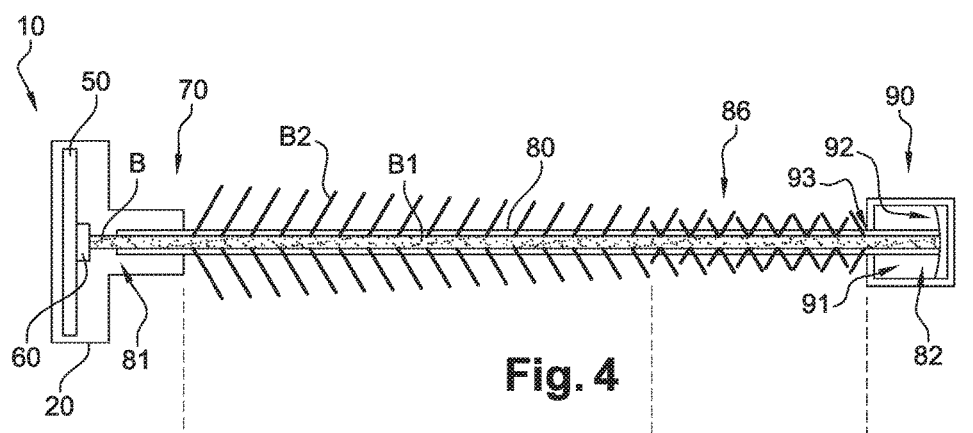
FIG. 4 is a sectional view similar to FIG. 2, for a light module according to an embodiment of the invention, comprising a reflector.

FIG. 4 shows a light module 10 according to an embodiment of the invention, comprising a reflector 90 positioned at end 82 of fiber 80. Reflector 90 is designed to reflect beam B1 back from end 82 toward end 81 of fiber 80.

Reflector 90 has an inner space 91 receiving end 82 of fiber 80. Reflector 90 has a concave reflecting surface 92 disposed inside space 91 and designed to reflect beam B1. Reflector 90 has an entry opening 93 formed facing surface 92 and designed for inserting end 82 into space 91. Reflector 90 can be secured to fiber 80 by any suitable means, for example by force-fitting and/or gluing or welding.

Opening 93 may have an inner diameter inferior to an outer diameter of fiber 80 at end 82, which is then inserted into opening 93 by force-fitting. That solution provides a sealed fitting between fiber 80 and reflector 90, which is important for use in the automotive field. Moreover, that solution makes gluing and welding optional. Thus, that sealed fitting can be obtained at a low cost, which is also important in the automotive field.

Alternately, opening 93 may have an inner diameter equal or superior to an outer diameter of fiber 80 at end 82. In this case, the sealed fitting between fiber 80 and reflector 90 can be obtained by gluing or welding.

Reflecting surface 92 can receive end 82 in abutment contact, ensuring that beam B1 is fully reflected back toward end 81.

Alternately, a gap can be provided between end 82 and reflecting surface 92, which is designed with a curved shape ensuring that beam B1 is fully or mostly reflected toward end 81.

Figure 5:
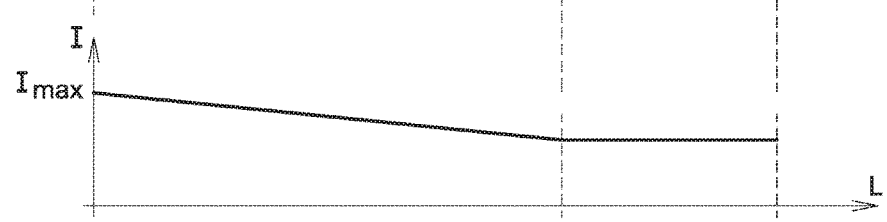
FIG. 5 is a graph similar to FIG. 3, for the light module of FIG. 4.

FIG. 5 shows the intensity I of illumination emitted by optical fiber 80 along its length L, in the light module 10 of FIG. 4. A maximal intensity Imax can be observed when fiber 80 goes out of cover 20. Since beam B1 is reflected by reflector 90 from end 82 toward end 81, more beams B2 are transmitted outside fiber 80 in an end area 86 near end 82. Thus, the minimal intensity observed in end area 86 is higher and better distributed on FIG. 5 than on FIG. 3.

Thanks to reflector 90, the loss of beam energy is compensated in end area 86. Consequently, the overall illumination and visual aspect provided along fiber 80 are improved.

Figure 6:
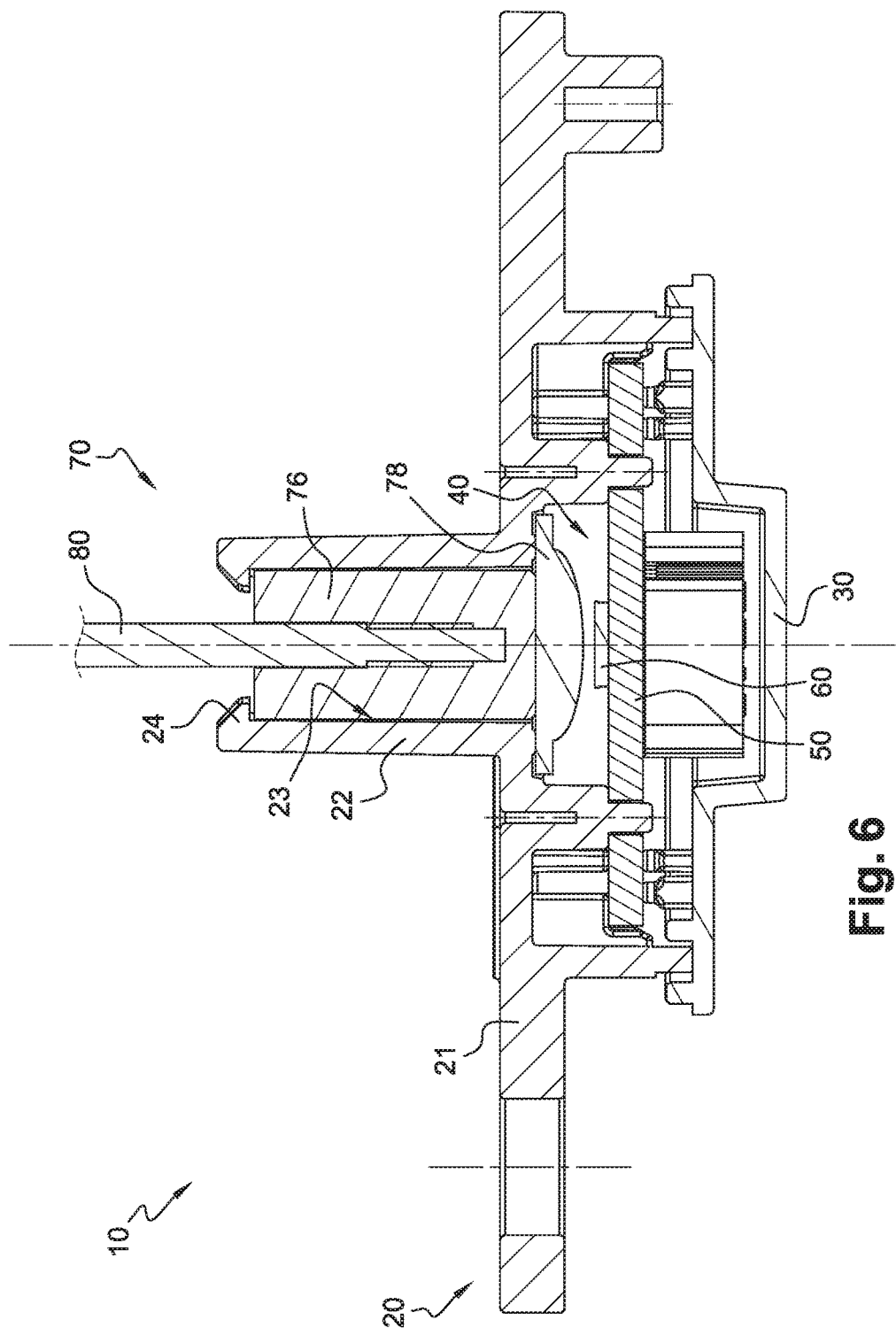
FIG. 6 is a partial sectional view of a light module according to an embodiment of the invention, at a larger scale.
Figure 7:
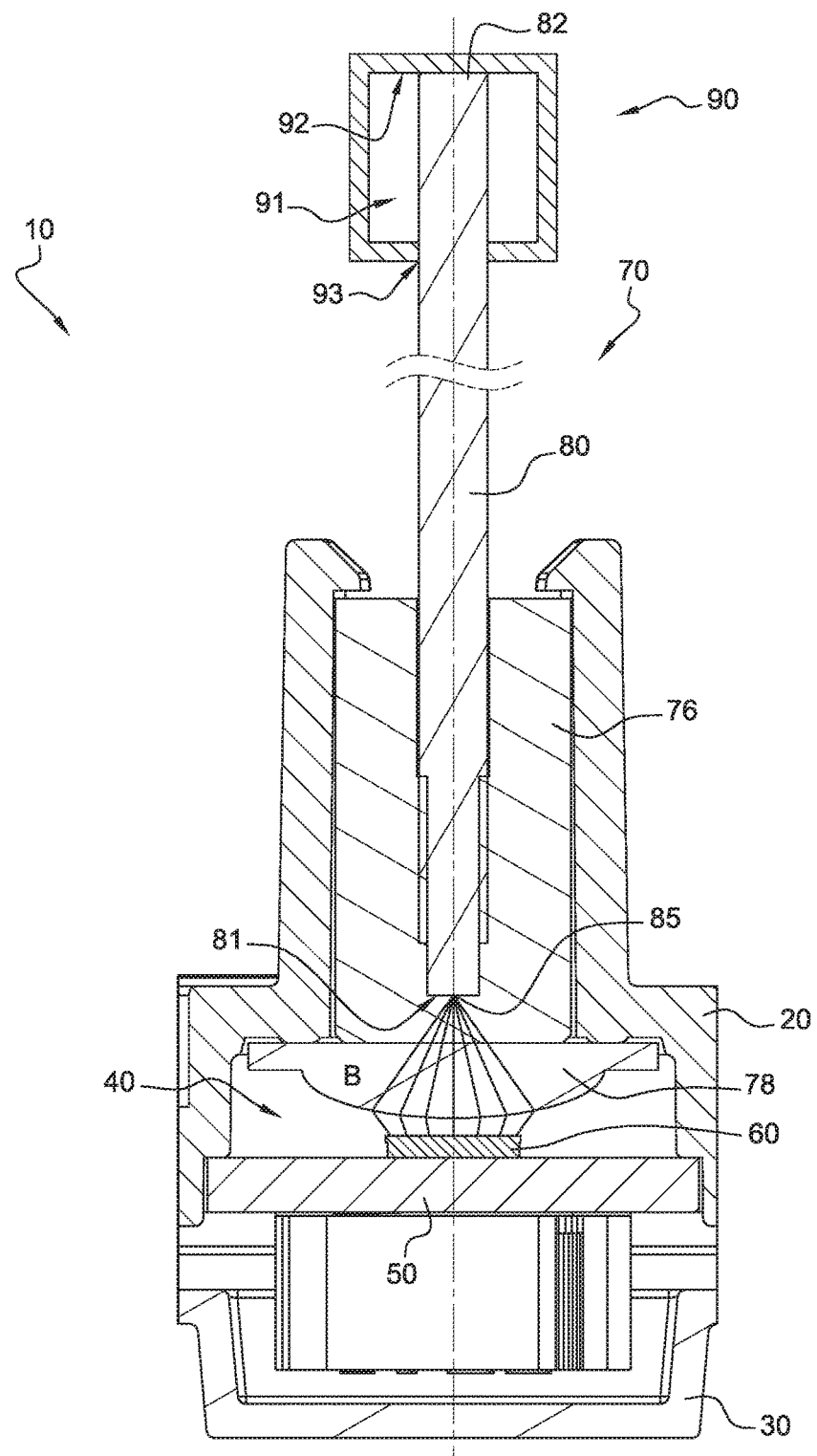
FIG. 7 is another partial sectional view of the light module of FIG. 6, at a larger scale.

FIGS. 6 and 7 show a second embodiment of the invention. In this embodiment, elements similar to the first embodiment have the same references and work in the same way. Only the differences with respect to the first embodiment are described hereafter.

In this embodiment, the light module 10 is more detailed and the reflecting surface 92 has a plane shape.

Module 10 is designed for illuminating an outer component of a vehicle. Module 10 comprises a housing 20, a cover 30, a printed circuit board 50, a light source 60 and a light guide 70. Housing 20 and cover 30 delimit a watertight inner space 40 between them. Space 40 receives PCB 50, on which source 60 is mounted. Guide 70 is mounted in housing 20, facing source 60.

Housing 20 is designed for fastening module 10 to vehicle 1 directly to the outer component. Housing 20 is also designed for receiving guide 70, PCB 50, then cover 30 to close space 40. Housing 20 comprises a main body 21 shaped has an elongated plate. Housing 20 comprises a protrusion 22 formed on the outer side of body 21. Protrusion 22 has a tubular shape and delimits a hollow recess 23 for receiving part of guide 70. Recess 23 is open opposite cover 30, such that guide 70 can extend outside module 10. Opposite cover 30, the outer end of protrusion 22 is provided with hooks 24 for retaining guide 70 in recess 23.

Cover 30 is mounted on housing 20 for closing space 40, after PCB 50 has been positioned therein. Housing 20 and cover 30 are watertight sealed relative to each other, for example by ultrasonic or laser welding.

PCB 50 is fastened to housing 20 inside space 40. PCB 50 is provided with conductive tracks and connection holes, not shown for simplification purpose. PCB 50 is designed for mechanically supporting and electrically connecting electronic components, such as source 60 and system 80.

Light source 60 is preferably a light-emitting diode. Source 60 is configured for emitting the illumination beam B, for example within a cone having an apex angle of 100 degrees. Source 60 is fixedly mounted on PCB 50. For example, source 60 is provided with connection pins inserted in holes of PCB 50.

Light guide 70 is mounted in housing 20 facing source 60. Guide 70 extends at least partly outside space 40 for guiding beam B along component 2. Guide 70 comprises an abutment 76, a lens 78, the optical fiber 80 and the reflector 90.

Fiber 80 extends outside space 40 for guiding beam B along the outer component. Fiber 80 has a diameter of approximately 2 or 3 millimeters. Beam B enters at end 81 and is guided along fiber 80.

Abutment 76 has a cylindrical shape and is made of a transparent material. End 81 of fiber 80 is integrated inside abutment 76, for example by screwing, clipping or overmolding. Abutment 76 is positioned in recess 23, with hooks 24 in retaining contact with its outer surface.

Lens 78 is positioned between source 60 and end 81, such that beam B emitted by source 60 is focalized toward end 81. Lens 78 has a specific convergent shape, entirely focalizing beam B on a focus point 85 located at the precise center of end 81. Lens 78 is transparent, while housing 20 and cover 30 are preferably opaque, thus ensuring that beam B it transmitted outside module 10 only through guide 70, more precisely fiber 80.

Other non-shown embodiments can be implemented within the scope of the invention. In addition, technical features of different embodiments can be, in whole or part, combined with each other. Thus, light module 10 can be adapted to the specific requirements of the application.

The invention claimed is:

1. A light module, comprising:
    a light source configured for emitting an illumination beam; and
    an optical fiber guiding the illumination beam between a first end facing the light source and a second end opposite the light source;
    wherein the light module further includes a reflector positioned at the second end of the optical fiber and reflecting the illumination beam back from the second end toward the first end of the optical fiber wherein the reflector has an entry opening having an inner diameter inferior to an outer diameter of the optical fiber at the second end, which is inserted into the entry opening by force-fitting.

2. The light module according to claim 1, wherein the reflector is glued or welded to the optical fiber.

3. The light module according to claim 1, wherein the reflector has a reflecting surface receiving the second end of the optical fiber in abutment contact.

4. The light module according to claim 1, wherein the reflector has a concave reflecting surface.

5. The light module according to claim 1, wherein the reflector has a plane reflecting surface.

6. The light module according to claim 1, further comprising a lens positioned between the light source and the first end of the optical fiber, such that the illumination beam emitted by the light source is focalized toward the first end of the optical fiber.

7. A light module, comprising:
 a light source configured for emitting an illumination beam; and
 an optical fiber guiding the illumination beam between a first end facing the light source and a second end opposite the light source;
wherein the light module further includes a reflector positioned at the second end of the optical fiber and reflecting the illumination beam back from the second end toward the first end of the optical fiber, wherein the reflector has an entry opening having an inner diameter equal or superior to an outer diameter of the optical fiber at the second end.

8. The light module according to claim 7, wherein the reflector is glued or welded to the optical fiber.

9. The light module according to claim 7, wherein the reflector has a reflecting surface receiving the second end of the optical fiber in abutment contact.

10. The light module according to claim 7, wherein the reflector has a concave reflecting surface.

11. The light module according to claim 7, wherein the reflector has a plane reflecting surface.

12. The light module according to claim 7, further comprising a lens positioned between the light source and the first end of the optical fiber, such that the illumination beam emitted by the light source is focalized toward the first end of the optical fiber.

13. A light module, comprising:
 a light source configured for emitting an illumination beam; and
 an optical fiber guiding the illumination beam between a first end facing the light source and a second end opposite the light source;
wherein the light module further includes a reflector positioned at the second end of the optical fiber and reflecting the illumination beam back from the second end toward the first end of the optical fiber, configured for illuminating an outer component of a vehicle and comprising:
 a housing for fastening the light module to the vehicle;
 a cover mounted on the housing;
 an inner space delimited between the housing and the cover;
 a printed circuit board mounted in the inner space;
 the light source mounted on the printed circuit board and configured for emitting the illumination beam; and
 a light guide mounted in the housing facing the light source and extending outside the inner space for guiding the illumination beam along the outer component, wherein the light guide includes the optical fiber extending outside the inner space.

14. The light module according to claim 13, wherein the reflector is glued or welded to the optical fiber.

15. The light module according to claim 13, wherein the reflector has a reflecting surface receiving the second end of the optical fiber in abutment contact.

16. The light module according to claim 13, wherein the reflector has a concave reflecting surface.

17. The light module according to claim 13, wherein the reflector has a plane reflecting surface.

18. The light module according to claim 13, further comprising a lens positioned between the light source and the first end of the optical fiber, such that the illumination beam emitted by the light source is focalized toward the first end of the optical fiber.

* * * * *